United States Patent
McGaffigan

[11] Patent Number: 5,846,117
[45] Date of Patent: Dec. 8, 1998

[54] VEHICLE TRACK LIGHTING SYSTEM

[76] Inventor: Thomas H. McGaffigan, 19089 Brookhaven Dr., Saratoga, Calif. 95070

[21] Appl. No.: 688,811

[22] Filed: Jul. 31, 1996

Related U.S. Application Data

[60] Provisional application No. 60/001,813, Aug. 1, 1995.

[51] Int. Cl.[6] ............................................... A63H 17/28
[52] U.S. Cl. ........................................ 446/219; 446/438
[58] Field of Search ................................. 446/219, 485, 446/491, 431, 444, 438, 439, 455; 273/DIG. 24; 238/10 A, 10 R, 10 E, 10 F; 362/61, 298, 301, 397, 31

[56] References Cited

U.S. PATENT DOCUMENTS

| | | | |
|---|---|---|---|
| 1,967,548 | 7/1934 | Bartels | 362/31 |
| 2,074,251 | 3/1937 | Braun | 446/175 |
| 2,080,312 | 5/1937 | High | 446/219 |
| 2,093,642 | 9/1937 | Nystuen . | |
| 2,575,820 | 11/1951 | Linton | 362/31 |
| 2,886,911 | 5/1959 | Hardesty | 238/10 A |
| 3,130,803 | 4/1964 | Wiggins | 446/175 |
| 3,131,496 | 5/1964 | Schropp | 362/31 |
| 3,752,974 | 8/1973 | Baker et al. | 362/31 |
| 4,093,973 | 6/1978 | Vaagenes | 362/31 |
| 4,377,918 | 3/1983 | Zbriger | 46/257 |
| 4,471,412 | 9/1984 | Mori | 362/31 |
| 4,872,680 | 10/1989 | Dennis | 446/446 |
| 5,006,090 | 4/1991 | Kennedy et al. | 446/457 |
| 5,128,842 | 7/1992 | Kenmochi | 362/31 |
| 5,248,276 | 9/1993 | Deleon | 446/485 |
| 5,308,274 | 5/1994 | Watrobkaa et al. | 446/23 |
| 5,396,350 | 3/1995 | Beeson et al. | 362/31 |
| 5,438,453 | 8/1995 | Kuga | 362/31 |
| 5,625,968 | 5/1997 | Ashall | 362/31 |

*Primary Examiner*—Robert A. Hafer
*Assistant Examiner*—Jeffrey D. Carlson
*Attorney, Agent, or Firm*—Burns, Doane, Swecker & Mathis, L.L.P.

[57] ABSTRACT

Vehicle lighting system consisting of a vehicle with an integral light source powered either internally by an on-board energy source such as a rechargeable capacitor or a battery. In another embodiment the light source may be powered by an external energy source such as electrical conductors that may be integral with a track. The light source in the vehicle interacts with features on the track. The track acts as a light reflecting and emitting medium so that it accepts the light transmitted from the vehicle, redirects the light rays and emits the light rays in the direction desired. These light rays can be continuous in nature and output or can be discontinuous. The discontinuous feature gives the impression of a pulsing light and this pulsing light is proportional to the vehicle's speed. This particular lighting system and track interaction can be used for children's toys or even larger full scale vehicle systems where it might be desirable to actually be able to track the vehicle and determine the speed of the vehicle from an outside observer.

29 Claims, 7 Drawing Sheets

VEHICLE TRACK LIGHTING SYSTEM

This application claims benefit of USC Provisional Application Ser. No. 60/001,813, filed Aug. 1, 1995.

FIELD OF THE INVENTION

This invention relates to toy vehicle racing sets. More particularly, this invention relates to toy vehicle racing sets in which light rays are emitted around the vehicle and the track by light rays originating from the vehicle and interacting with the track as the vehicle travels around the track. These racing sets include sets which use slotted type track, non-slotted track and train type track.

BACKGROUND OF THE INVENTION

Historically toy racing sets include; toy vehicles and a series of interconnecting track sections. The vehicles themselves are either gravity powered, spring powered or powered by electric motors which receive electrical current from conducting strips in the track. The vehicles can be either guided by a pin on the underside of the vehicle which rides in a center slot in the tracks or by the outer rails of the track and the wheels of the vehicle.

Existing toy racing sets do not incorporate any features in the track for retransmitting light rays which originate from the vehicle. Previous vehicle systems have incorporated on-board light sources but these light sources have been pointed into the direction of travel of the vehicle and typically simulate miniature headlights of the vehicles. For example, U.S. Pat. No. 4,377,918 to Zbriger discloses a vehicle which incorporates rear brake lights and roof mounted emergency lights to add to the realism of the vehicle. The Zbriger vehicle light source system and others do not optically interact with the track. One prior art invention that does utilize mechanical interaction between the vehicle and the track is disclosed in U.S. Pat. No. 5,308,274 to Watrobka. The Watrobka invention utilizes abrasives located on the outer guard rails of the track to abrade and heat up small pieces of flint attached to the car in order to create sparks. This invention does not use any optical interaction between vehicle light rays and features in or on the track.

In view of the prior art it would be desirable to provide a vehicle with a integral light source and a specially constructed track to achieve several different optical effects that add to the realism and enjoyment of toy vehicle racing sets.

Accordingly, an object of the present invention is to provide a toy vehicle racing set that achieves various lighting effects which add to excitement and enjoyment of the racing set.

Another object of the present invention is to provide a toy racing set in which light is emitted from various points in the vehicle track as the vehicle travels around the track.

Yet another object of the present invention is to provide a toy racing set in which light is emitted from the track behind the vehicle in order to give the appearance of flames being emitted from the vehicle.

Yet another object of the present invention is to provide a toy racing set in which light is emitted from the track around the vehicle in order to give the appearance that the vehicle is traveling on a beam of light.

Additional objects and advantages of the invention will become apparent from the following description and drawings.

SUMMARY OF THE INVENTION

The invention is a system consisting of a vehicle and track which interact to produce light ray emission from the track with light rays originating from the vehicle. The vehicle includes a light source which is not aimed in front of the vehicle as would be with conventional headlights but, instead, is aimed into the track. The vehicle can be a conventional two, three, or four wheeled vehicle that has the appearance of a ground based vehicle or in addition may have the appearance of a space-based vehicle. The vehicle may also have the appearance of a train type vehicle or even an underwater type vehicle. The track of the present invention contains features within the track for reflecting and emitting light rays from the vehicle placed on the track. This type of system is especially suitable for toy flexible type track systems or slotted track systems with imbedded electrical conductors. In either the case of the flexible type track or the slotted type track, both systems could retain all the features of the original track system but, in addition, they would also contain light ray reflecting and transmitting features to achieve several different optical effects that add to the realism and enjoyment of toy vehicle racing sets.

In one aspect of the invention there is provided a track comprising an operating surface, a reflecting surface below the operating surface to redirect light rays directed into the operating surface, and an emitting surface to allow light rays out of the track.

In another aspect of the invention, there is provided a vehicle for a track having an operating surface, said vehicle having a light source for directing light rays into the operating surface.

In yet another aspect of the invention, there is provided a system comprising: a track having an operating surface, a reflecting surface below the operating surface to redirect light rays directed into the operating surface and an emitting surface to allow light rays out of the track; and a vehicle for the track, the vehicle having a light source directing light rays into said operating surface.

BRIEF DESCRIPTION OF THE DRAWINGS

FIG. 2 is a cross-sectional view of a vehicle and an end view of a track having only a single central guide rail. FIG. 2 also illustrates various backlighting techniques.

FIG. 5 is a side cross-sectional view of a vehicle and track showing various vehicle light source orientations and one example of possible light ray reflective paths. FIG. 5 also illustrates an optional onboard power source and associated electrical connections.

DESCRIPTION OF THE INVENTION AND PREFERRED EMBODIMENTS

The specially designed track of the invention having an operating surface on which the vehicle travels and having a reflecting surface below the operating surface to redirect light rays directed into the operating surface acts as a light pipe and transmits the light through the track where it is finally emitted from the track. These redirected light rays can be emitted in any direction around the vehicle depending on the design of the track reflective features. In other words, the light rays can be emitted in front of, behind, or to the side of the vehicle. This creates a moving segment of light rays that gives the illusion that the vehicle is traveling on a beam of light rays or is emitting flames. The above described track may be made of material capable of transmitting light rays within itself.

Figure 1:
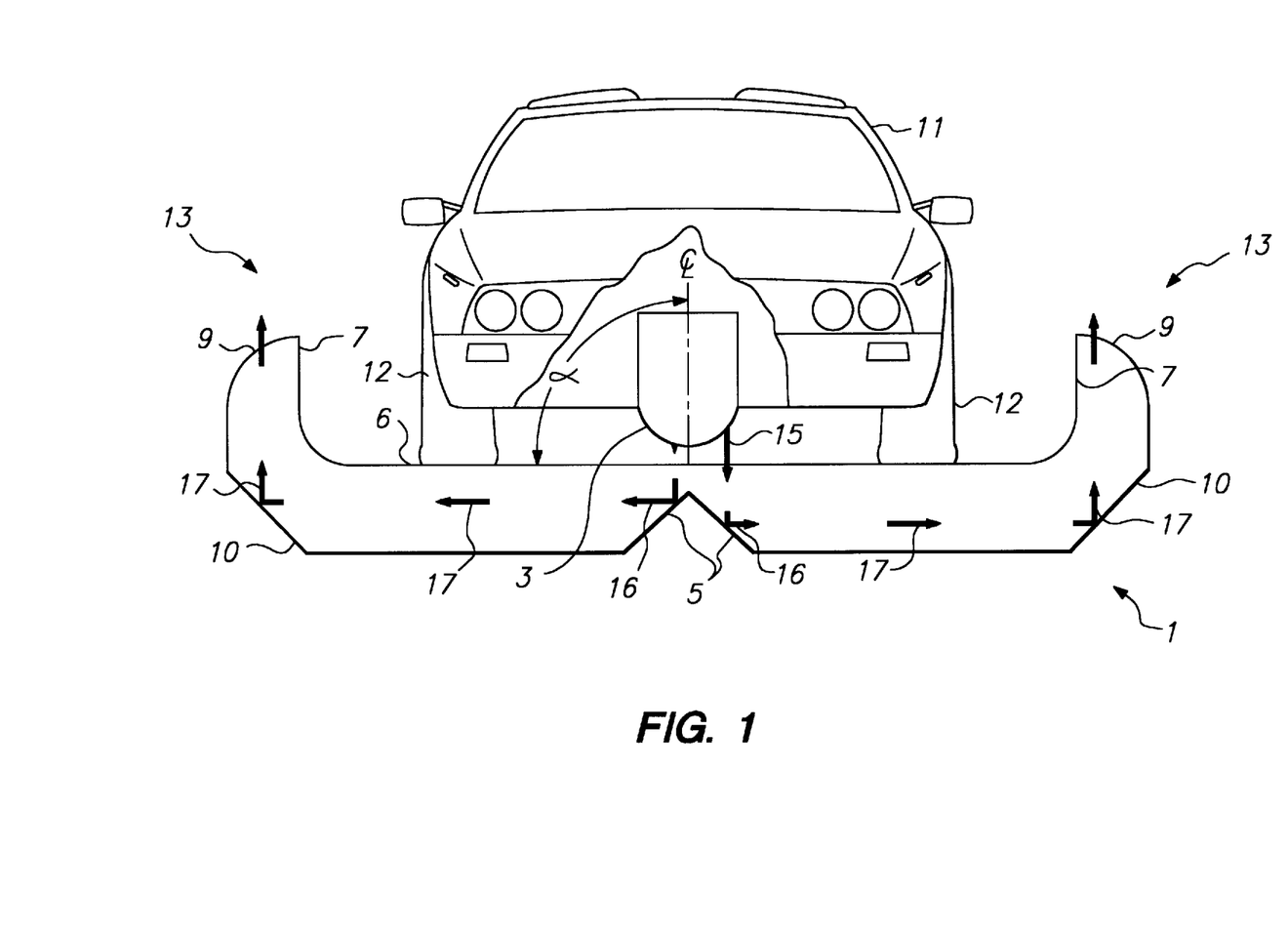
FIG. 1 is a partial cross-sectional view of a vehicle and an end view of a track having side guide rails.
Figure 2:
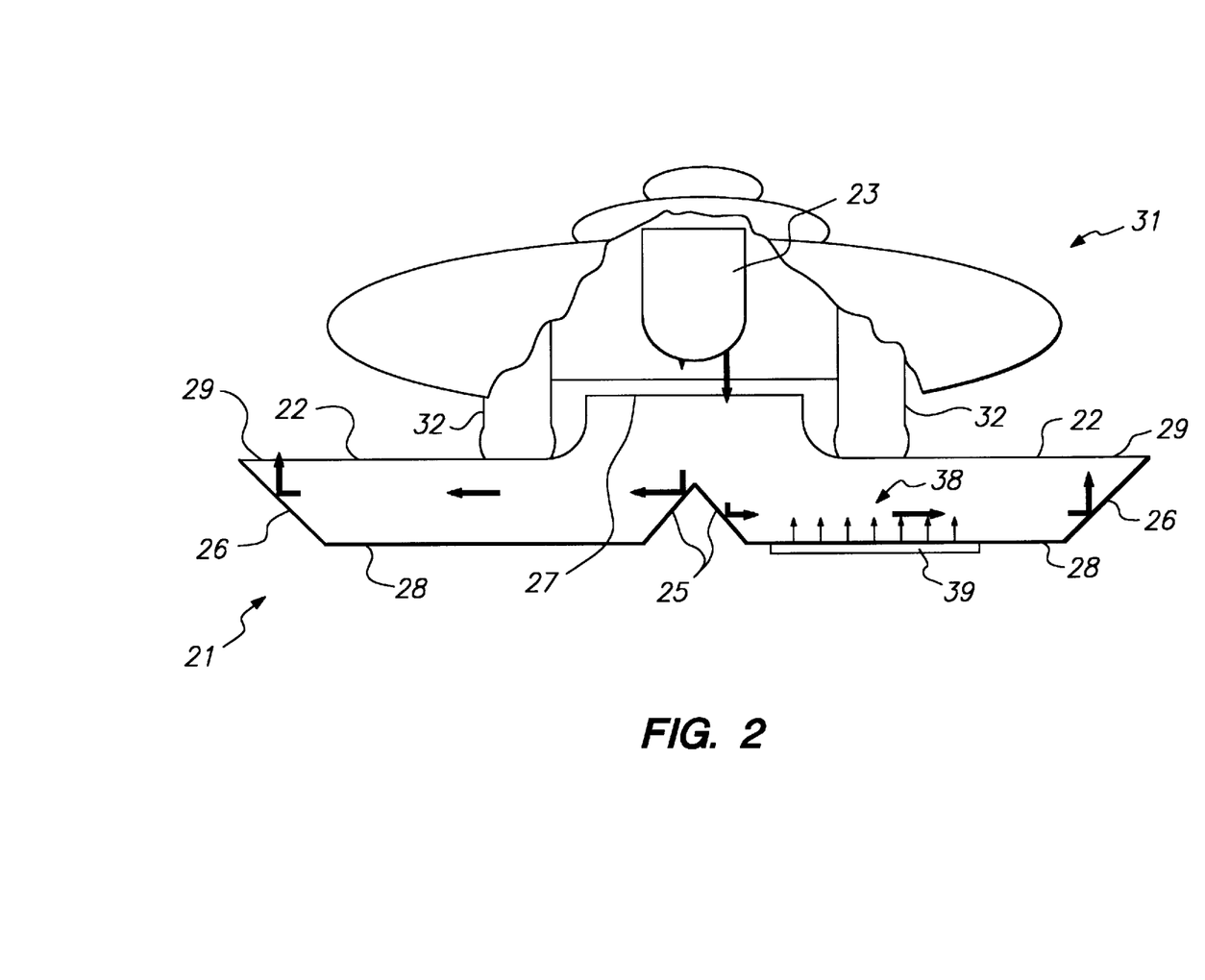
Figure 3:
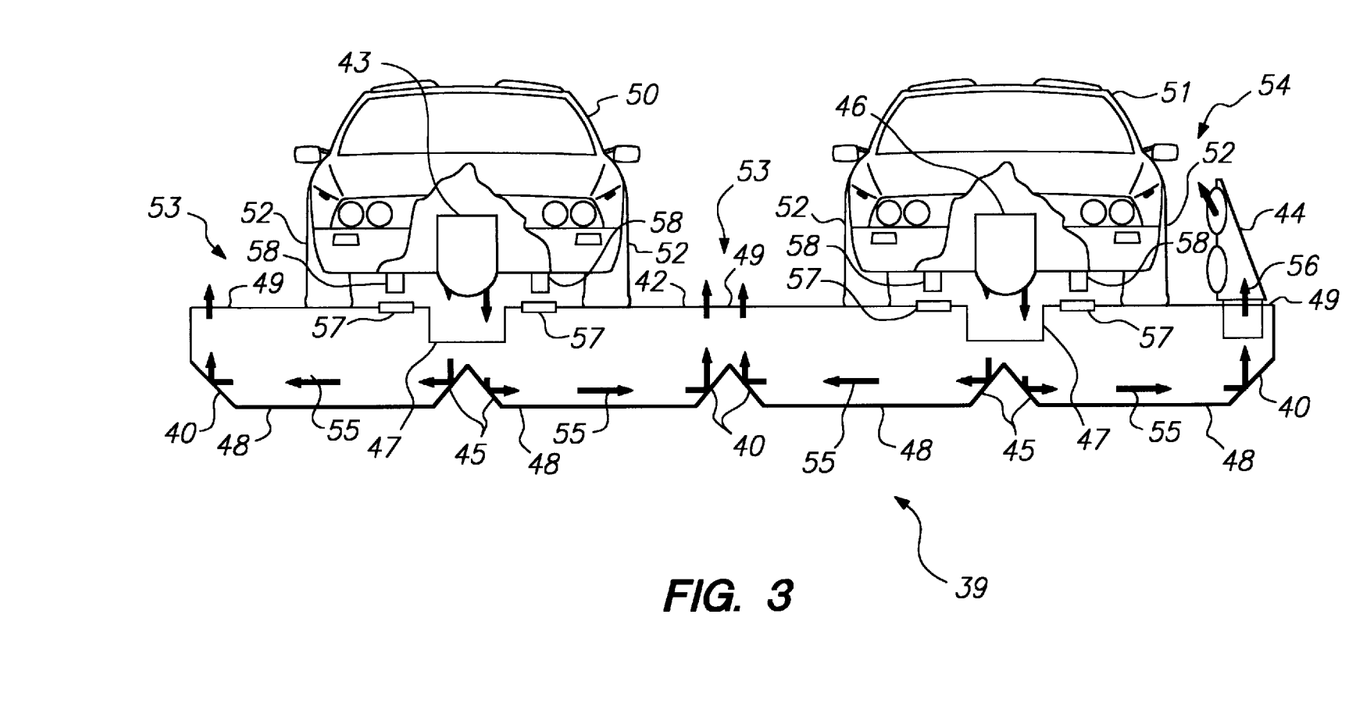
FIG. 3 is a partial cross-sectional view of two vehicles and the end view of a double track with imbedded electrical conducting segments and guide slots.

One embodiment of my invention utilizes light rays from a specially constructed vehicle which are projected generally perpendicular to the direction of travel of the vehicle into the operating surface of the track. FIGS. 1, 2 and 3 illustrate the embodiment. The interaction of the projected light rays with the track give the illusion that the vehicle is traveling on a beam of light rays. These emitted light rays can be interrupted by either reflection or blocking, thus resulting in pulsing light rays. These pulsing light rays are proportional to the vehicle's speed. In other words, when the vehicle is traveling slowly, the pulse rate is slow and when the vehicle is traveling quickly, the pulse rate is extremely fast. This pulsing light travels with the vehicle as it moves over the track. This pulsing light moves with the vehicle, thus giving the impression that the vehicle is riding on a beam of light similar to the case of a hovercraft riding on a cushion of air. A unique feature of this effect is that the position of the vehicle can be identified by the light rays emitted from the track surface. This unique combination of the special vehicle and track system is hereafter referred to as the LightRider™ system or LightRider effect.

In another embodiment of the invention the track may have an additional lighting system running along its length so that the edges of the track itself emit light rays. This additional light source is most effective if it is of a contrasting color to the vehicle light source and thus the aforementioned traveling light effect retained. This additional back lighting of the track is a very interesting feature because the light in the vehicle, which is transmitted into the track, is visible on top of the back lighting of the track itself. One very nice method in which to construct such a back lighting effect is to use a flexible electroluminescent lighting system. This electroluminescent lighting system can be laminated to the track itself. This is shown in FIG. 2. Electroluminescent lighting systems are flexible, rugged, durable and operate at relatively low voltages. Backlighting of the track itself can also be accomplished by incorporating luminescent pigment in the track itself. These pigments can be excited by the light source in the vehicle and external ambient light sources.

Figure 5:
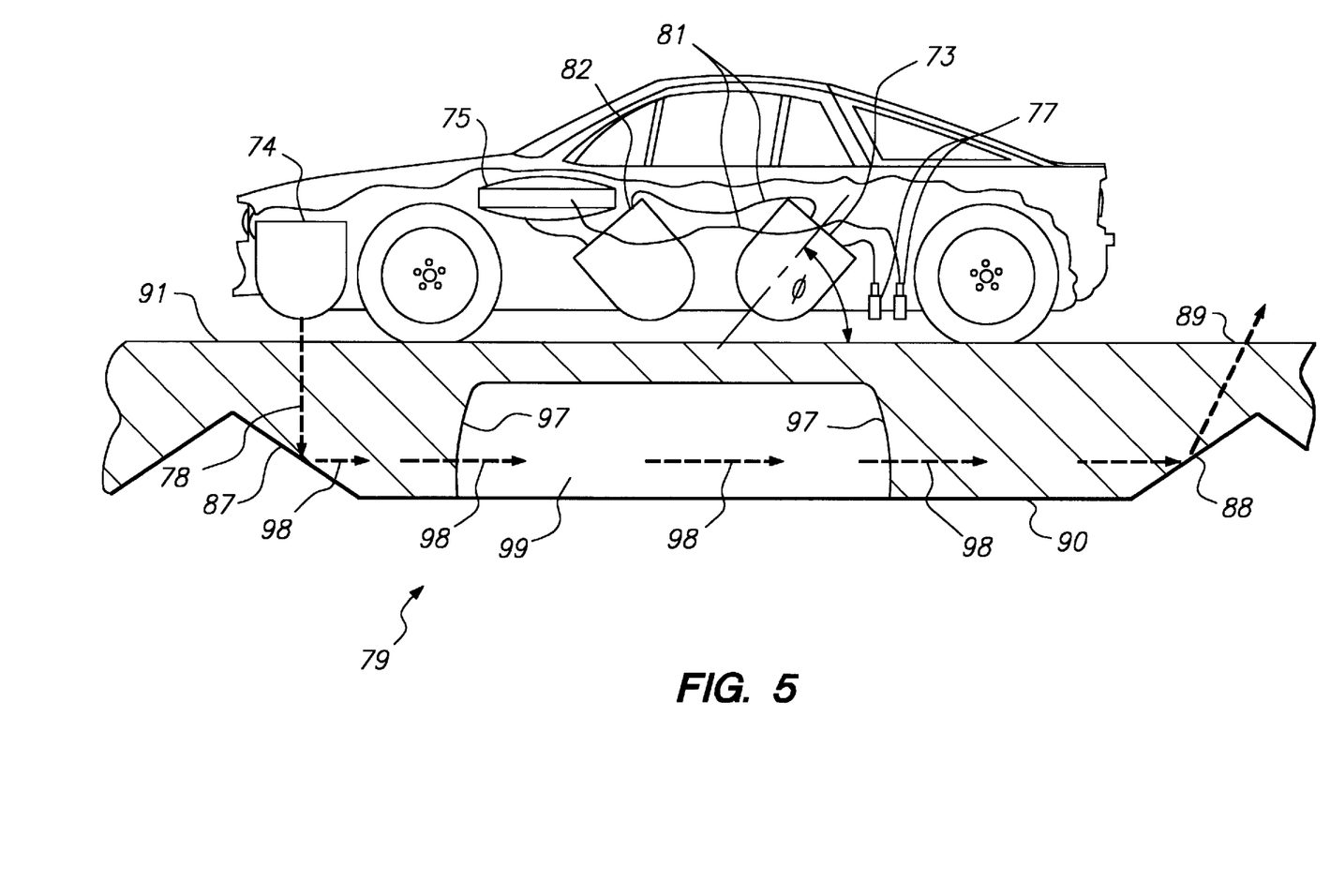

In another embodiment of the invention, the vehicle can be provided with a light source, for example, a small light emitting diode (LED) which is operatively connected to either a battery or a storage capacitor. This type of system is shown in FIG. 5. One type of storage capacitor which is very small in size, is an electric double layer capacitor type which is typically used for memory back-up applications in computers and hand held calculators. This type of capacitor can be obtained in either a 2.5 or 5 volt configuration and is about the size of a pencil eraser or a small button cell battery. Despite it's small size it has a very high capacitance, on the order of a third of a farad, thus it is ideal for powering a low power light source. With this high capacitance, and the low current drain of a LED, a very quick charging, low voltage, long duration light source can be constructed in a very small, 1"×1"×0.25", vehicle. This capacitor and LED lighting system is ideal for flexible track racing sets such as sold under the trademark Hot Wheels produced by Mattel and others.

With a capacitor power system such as this, a pair of LED's can have an on-time on the order of several minutes. A battery can also be used instead of the capacitor but has the disadvantage of requiring an on/off switch.

When a vehicle incorporates an integral power light source, should the vehicle leave the track, as in case of excessive speed, the onboard powered light source can also act as a beacon, helping to locate it in a darkened room. However, it is only when the vehicle is operating on the track that the light rays from the vehicle are transmitted into the track and the track itself emits light rays.

As mentioned earlier the light rays from the vehicle are directed into the track. The light rays can be directed perpendicular to the track and then the light rays reflected off reflective surfaces in the track and then re-emitted at the edges of the track. By utilizing transmission and reflection of light rays the track acts as a light pipe to capture and re-emit the light rays in the direction desired. The track should be constructed so that the surfaces of the track capture the light rays originating from the vehicle and reflect the light internally so that the track itself can direct the light rays to the desired location. Once the light rays arrive at the desired location it is sometimes advantageous to have a surface which is actually diffuse so that the light rays are forced to diverge when emitted from the track. This diffusion of the light rays at the emitting surface increases the apparent intensity and greatly increases the viewing angle. In other words, regardless of the position of the observer, the light rays that are emitted from the track can be observable from all angles. The simplest track configuration could consist of a strip of material with curved edges on either side and a centrally located reflective surface running the length of the track, see FIGS. 1 and 2. In order to promote a wide viewing angle in this simplest configuration, the light source in the vehicle would be angled such that the light rays generated by the light source are directed at an angle to the normal of the operating surface. Although a single light source could be utilized, two or more could also be used to increase the viewing angle and amount of emitted light.

Figure 6:
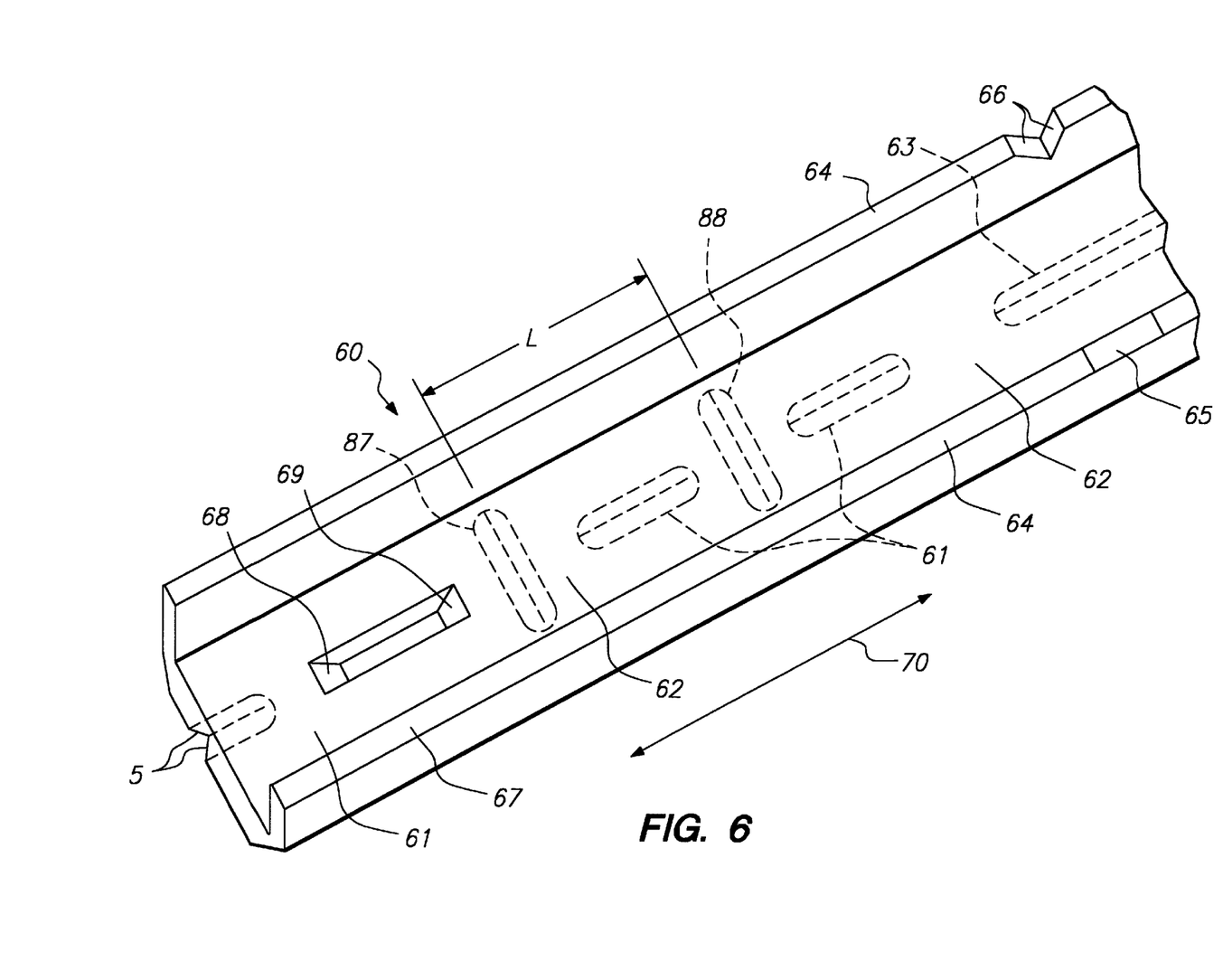
FIG. 6 is a partial perspective view of a track as shown in FIG. 1 illustrating the orientation of the light ray reflective features and the distance separating them.

A preferred reflective surface is created in a track which incorporates a 90 degree included angled groove in the support surface, i.e., the underside, of the track. This groove could be molded or extruded into the track during manufacture, see FIGS. 1, 2 and 3. With this type of arrangement the light source can be mounted perpendicular to the track, and the light rays that are directed normal to the operating surface are reflected off the reflective surface of the track and then re-emitted around the vehicle. This reflective surface can be made continuous or discontinuous. If this source is made continuous, the light output to the sides of the track is also continuous. When the feature is made discontinuous, the light is discontinuous and has a pulsing effect. This pulsing effect can also be achieved by having a continuous light ray reflecting surface, but a discontinuous light ray emitting surface. In other words, if there is a continuous reflecting surface but a discontinuous emitting surface this will cause the emitted light rays to pulse. To create a discontinuous emitting surface, the track can be painted with an opaque coating so that the light rays cannot exit and thus the pulsing effect is achieved. In addition, a reflecting surface can be incorporated in the track at the edges that actually reflects the light rays away from the observer and back into the track. These two methods of obtaining a pulsing light are shown in FIG. 6. Either one of these methods can be used to achieve the pulsing effect and, as mentioned earlier, the pulsing effect is proportional to the vehicle's speed.

Figure 4:
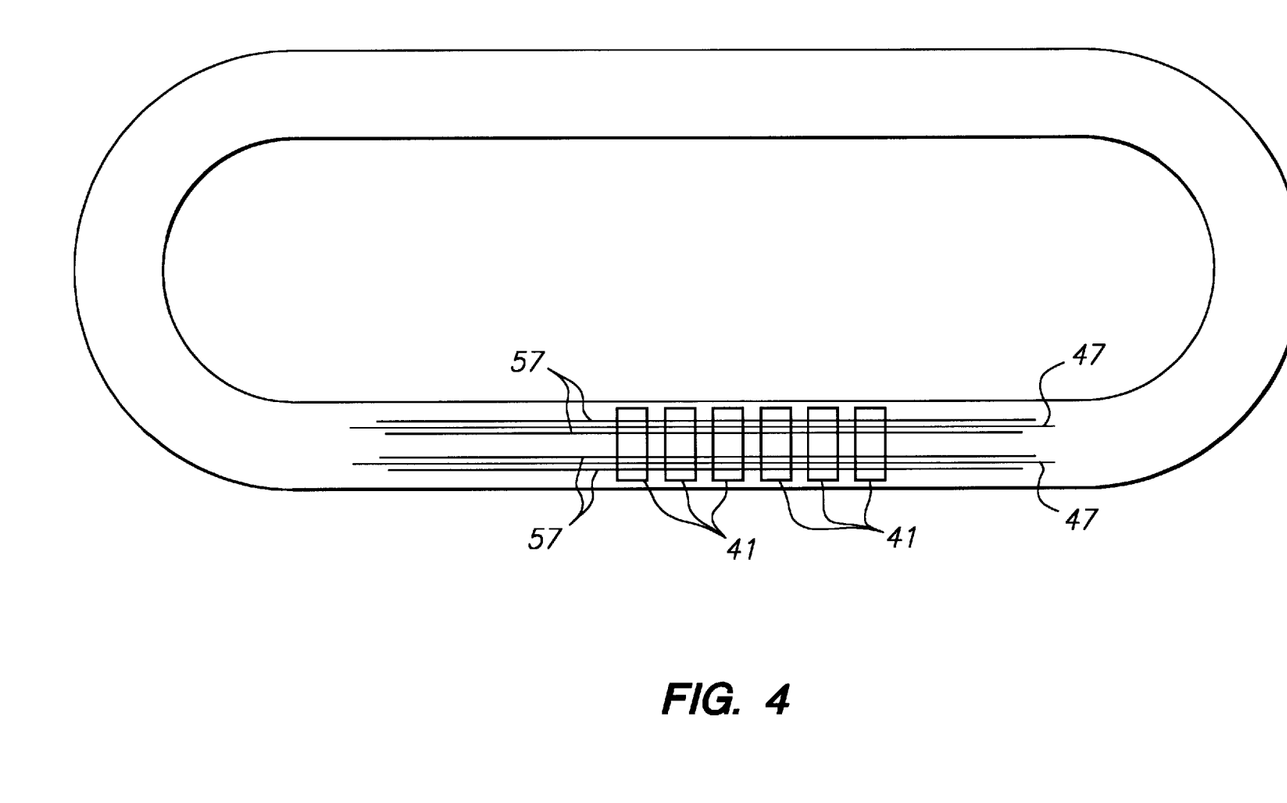
FIG. 4 is a plan view of a track similar to that shown in FIG. 3 showing separate reflecting segments.

When previously discussing the vehicle light source it was mentioned that capacitors or small batteries could be used as the energy storage device to power the vehicle light. Another method of powering the light source can be utilized when the track is a slotted type with integral electrical conductors. This slotted track configuration is shown in FIG. 3. Slot car type tracks incorporate imbedded electrical conductors that run along the length of the track. The vehicles utilize conductive brushes underneath to conduct electricity from the track into the vehicle in order to energize the motor and propel the vehicle. The electrical power derived from the track can also be used to power the light source for the vehicle lighting system. Reflective features can also be incorporated in this type of track, and the electrical power for the vehicle light source and motor obtained from the conductors in the track. Typically slot car tracks are several inches wide in order to accommodate two or more vehicles racing side by side, thus enabling two vehicles to compete against each other. The LightRider lighting system can be incorporated into this type of track by making the entire track from a transparent material such as clear polycarbonate, styrene or the like and incorporating the light ray reflecting and emitting surfaces directly into the track. This type of track is typically not flexible, and in fact, most slot car type tracks are semi-rigid in nature. The slot car track pieces can be made entirely of the transparent material, with the light piping features integral, or sections of the track may incorporate discrete areas of light piping segments. A slotted type track with discrete light piping segments is shown in FIG. 4. In the case of discrete segments, the aforementioned pulsing effect would be achieved because the segments are spaced apart and are separated by non reflective sections. If the track is molded entirely of transparent or translucent material, the retransmitted light can be emitted from several surfaces simultaneously. By utilizing multiple reflecting and emitting surfaces an apparent trail of light rays, e.g., a flame, is emitted from the traveling vehicle. Some of the materials that can be utilized for the track are: nylon, polycarbonate, PVC, styrene and PET. The material used for the track or the reflective segments should be transparent or translucent in order to optimize the light piping effect. Another group of materials that are very adaptable to this type of system are various transparent plastics that contain fluorescing pigments. One type of acrylic material that contains these fluorescing pigments has the trade name LISA, and is manufactured by Miles Corporation. This material can be obtained in a variety of colors: neon green, orange, blue and others. Because of the florescent pigment, when the material is struck by external light rays, it retransmits light rays generated by the excited florescent pigment. In order to best utilize these florescent materials the light in the vehicle should be a contrasting color. For example, the track may be a transparent fluorescing green color and the light rays emitted from the vehicle can be red. The red color of the vehicle light will be transmitted into the track and then emitted and superimposed on top of the green florescent track. This gives a very dramatic effect, especially in the pulsing configuration. This florescent pigment material can be excited by the light in the vehicles and also by ambient light. When this fluorescing material is utilized in the track, it provides a back lighting of the track itself which is very interesting, especially when it is combined with the vehicle light rays super-imposed on it. An additional back lighting effect can be obtained by using luminescent pigments in or on the track in order to provide a trail of light rays on the track resulting from the luminescent pigments being energized by the passing vehicle light rays. This effect looks similar to the effect seen in extended long exposure photographs of vehicles traveling at night. The combination of the superposition of the vehicle light on the track and a back lighting technique is very unique and gives a very dramatic effect. It is not necessary to use fluorescing or luminescent materials to give the LightRider effect but their use adds a feature that is very unique.

In order to achieve maximum light transmission from the vehicle to the reflective track and then to the surroundings it is best to have the light source in the vehicle directed in an optimum manner such that minimum losses of the light occur. Light ray losses are minimized by maximizing transmission into the track and maximizing the reflection off of the track. With proper design of the reflective features, total internal reflection beneath the operating surface of the track can be obtained. The addition of metallic reflective coatings can also be used to enhance the reflection from the reflective surfaces in an uncoated configuration. The standard formulas for refraction and reflection may be used for calculating the angles of the reflective surfaces. These equations may be found in "Fundamentals of Physics" revised printing, by Halliday and Resnick, published by John Wiley and Sons, Inc., which is incorporated herein by reference. When the reflective surface is generated by a discontinuity on the track support surface, refraction of the emitted light ray aids in increasing the viewing angle. In addition, by tailoring the reflecting surfaces to take advantage of total internal reflection, the incident light ray can be projected as far as desired without undue loss of intensity within the track. As previously mentioned, the reflecting surface can actually be molded or machined into the track by incorporating the reflective surfaces angled relative to the operating surface in the track. These reflecting surfaces may be in the operating surface of the track or on the support surface. When these reflective surfaces are in the support surface of the track they are protected from dirt and other forms of abuse that would otherwise degrade the track's reflective properties. When the reflective features are incorporated in the operating surface they are subject to degradation by dirt and dust and may interfere with the travel of the vehicle.

Figure 7:
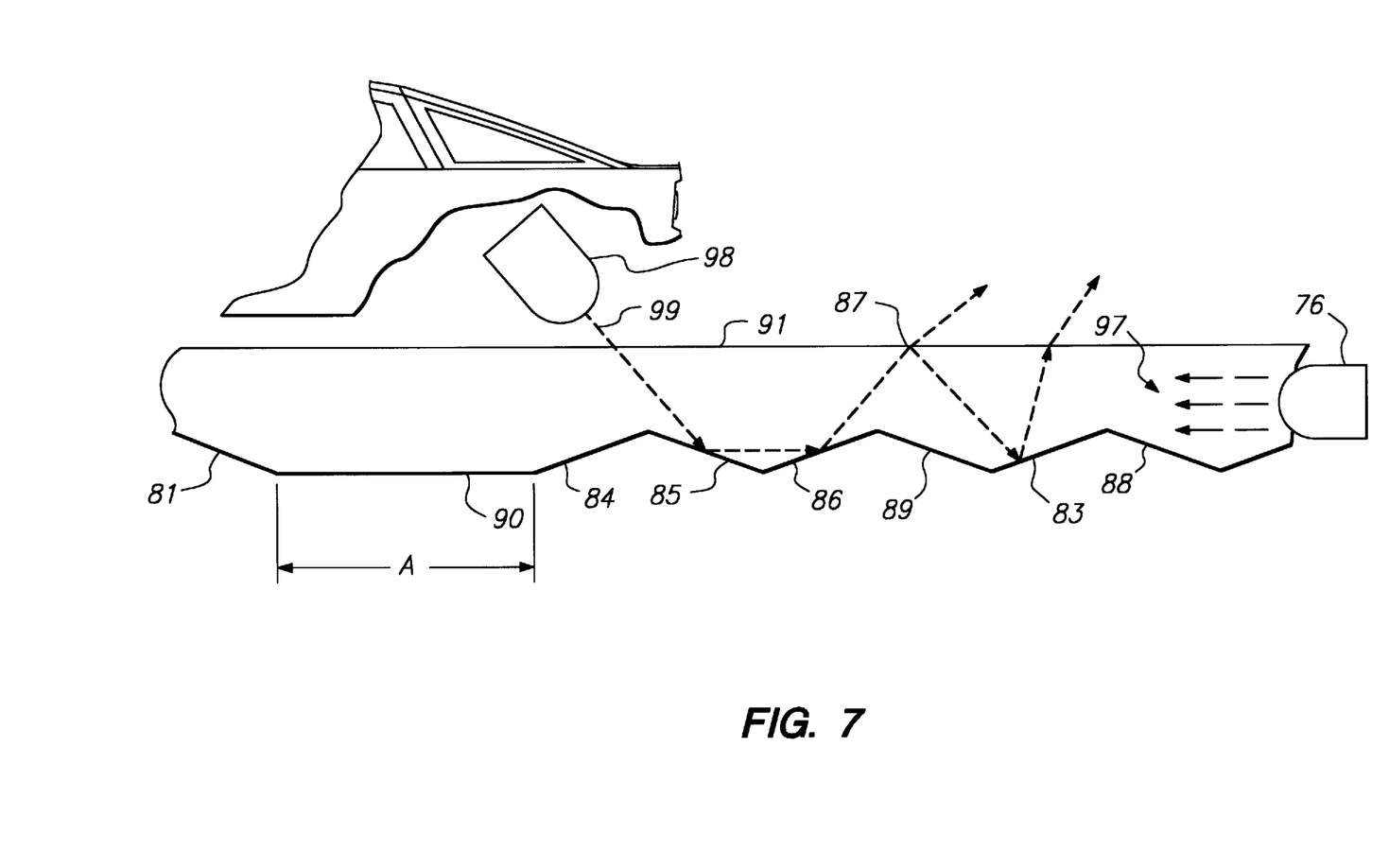
FIG. 7 is a partial cross sectional view of a portion of a vehicle and track illustrating multiple reflections of a single light ray.

When the track incorporates reflective surfaces which are oriented in line with the direction of vehicle travel, the emitted light rays are reflected generally transverse to the direction of travel. When it is desired to increase the viewing angle the light source is mounted such that light rays are directed at an angle to the normal of the operating surface. This is shown in FIGS. 5 and 7. If the light sources are pointed towards the middle of the vehicle as shown later in FIG. 5, with one light source pointed towards the track ahead of the vehicle, and the other light source pointed toward the rear of vehicle, this results in the light rays angled 45 degrees to the direction of travel of the vehicle. With this type of orientation the light rays that are emitted have an increased viewing angle to the observer. In other words, the light from the vehicle can be seen from a greater range of angles not just from directly in to the side of the vehicle. If the light sources are not angled to the normal in this manner the light rays are not readily seen ahead or behind the vehicle but only to the side. This effect can be compensated for somewhat by adding a diffusing surface to the light ray emitting surfaces of the track. This diffusing surface breaks up the emitted light rays thus projecting the light rays both ahead of and in behind of the vehicle. This diffusing surface at the edge of the track would be desirable in the case of using a single light source.

With further reference to the drawing, FIG. 1 shows an embodiment of a vehicle track system of the invention. The track is shown generally at 1. The light source is identified at 3. Light source 3 is shown as a LED but it is not limited to a LED type light source. An incandescent light, a neon light, or fluorescing type light may also be utilized. The choice of light source 3 is only dictated by the energy source being utilized and the overall cost targets of the system. A focusing element such as a reflector or lens may be used with all of the aforementioned light sources. LED's are ideal for a toy type systems because they are inexpensive, lightweight, rugged and very small. In addition LED's are available in a variety of colors and emission wavelengths. The availability of specific emission wavelengths is especially desirable when the vehicle lighting system is utilized to energize a luminous material incorporated within the track, since luminous materials are excited by specific wavelengths of light rays.

Light source 3, is shown emitting light in a path 15 which is at a angle α to operating surface 6. For equal emission of light from both emitting surfaces 9, α is about approximately 90 degrees and first reflecting surfaces 5 and second reflecting surfaces 10 are symmetrical about the centerline. Reflecting surfaces 5 and 10 are shown integral with the track in the supporting surface. Reflecting surface 5, positioned below operating surface 6, acts to reflect the light emitted from the light source 3, into the track, to reflecting surfaces 10, where the light is finally emitted at emitting surfaces 9. The light emitted into the air is shown generally at 13. The internally reflected light rays is identified by number 17. In summary, the light rays originate from the light source, 3, reflect off surfaces 5, are transmitted by the track itself at 17, are reflected again at surface 10 and is finally emitted at surfaces 9 and are observable to an observer at 13. Reflecting surface 5 is shown as a 45 degree angled surface to the track support surface. This reflecting surface should be at such an angle that the light transmitted from the light source 3, is reflected into the track itself and then once again reflected at surface 10 and then finally emitted at surface 9. The configuration of surface 9 and the surface finish of surface 9 dictates the appearance of the light rays. In other words, if surface 9 is a highly polished surface, the light rays will basically exit in a straight direction. This limits the viewing angle and is not always desirable. If it is desirable to have a wider viewing angle for the observer, surface 9 can have a roughened surface which acts as a diffusion type surface and thus gives a much wider viewing angle for the observer. This diffusion feature also gives the appearance of the light rays providing a much wider and longer lighted section on the track. Also shown in FIG. 1 are track guide rails 7. Two of these rails are shown in FIG. 1 to guide each wheel 12 of the vehicle 11. These rails are mechanical features to guide the vehicle so that it does not roll off the track to either side. Vehicle 11, is shown resting on operating surface 6, centered over the center of track 1. The vehicle itself can be any type of vehicle in appearance whether a conventional automotive type vehicle, a truck or even a motorcycle. In this embodiment reflecting surfaces are defined by a discontinuity i.e., a void in support surface 6.

FIG. 2 illustrates a slightly different track configuration yet it incorporates all the same elements as shown in FIG. 1. The track in FIG. 2, is identified generally at 21, incorporates a single guide rail 27. This single guide rail is centrally located and the wheels, 32 of the vehicle, 31 straddle this guide rail. The track incorporates first reflecting surfaces 25, second reflecting surfaces 26, operating surfaces 22 and support surfaces 28. The light source is identified at 23. Emitting surfaces 29, can incorporate any type of surface finish, but if the surface is made diffuse, then the viewing angle to the observer is much wider and much brighter than would be if the surface was not diffuse. Surfaces 29 may be painted to provide additional variations in the appearance of the light. The color of these painted surfaces can be changed or made with discontinuous opaque segments over the emitting surface, the light can be made to pulse on and off with the vehicle travel. Additionally illustrated in FIG. 2 is a electroluminescent light source shown at 39. Luminescent light source 39, is laminated to support surface 28 with the emission surface facing the support surface. With the light source laminated in this manner it will not interfere with the vehicle motion. Light rays emitted from the electroluminescent light source are shown generally at 38.

FIG. 3 shows yet again another track configuration which is similar to FIG. 1. The track itself is shown generally at 39, vehicles are shown at 50 and 51, the light sources at 43 and 46, first reflecting surfaces 45, second reflective surfaces at 40, and track guide slots 47. The track guide slots 47, are recessed below the operating surface of the track. In contrast to the guides shown in FIG. 1 and FIG. 2 the guide shown in FIG. 3 is a slot below the operating surface of the track. Vehicle wheels 52 are not effected by the guide slot 47. The guiding feature for the vehicle in FIG. 3 is a pin (not shown) which protrudes into the guide slot 47. Light source 43 can also be utilized for the function of a guide pin, if desired. The track shown in FIG. 3 has an emitting surface 49, operating surface 42 and support surfaces 48. The emitted light rays are shown generally at 53 and the transmitted light rays at 55. Also shown in FIG. 3 are imbedded track electrical conductors 57. These electrical conductors can be utilized to power the motor in the car, and additionally, the light source in the car. The corresponding vehicle conductors are shown at 58.

Also shown in FIG. 3 is a connectable accessory shown at 44. Accessory 44 may be operatively connected to emitting surface 49 thus allowing light rays 56 to enter the accessory and be emitted at 54. Accessory 44 is shown in the figure to be a guard rail but it's form is not limited to this. For example, the accessory could be a street light or an electronic vehicle lap counter triggered by the emitted light, or other device.

The reflecting and emitting sections of the track shown in FIG. 3 can be continuous in nature or it my be desirable to have discrete segments of these reflective emitting sections integrated into a much larger track. FIG. 4 illustrates in plan view this type of configuration with the aforementioned discrete segments. These individual segments are identified as items 41. It is understood that segments 41 contain the same types of reflective and emitting surfaces as those shown in FIGS. 1, 2, 3 and 7. It is also understood that these reflecting surfaces may be oriented in line with the direction of vehicle travel as shown in FIGS. 1, 2 and 3 or transverse as shown later in FIGS. 5 and 7. In general if the reflective surface is oriented in line with the direction of travel the emitted light rays will be transverse to the direction of travel. Conversely, if the reflecting surface is oriented transverse to the direction of travel the emitted light rays will be in line with the direction of travel. The electrical conductors shown at 57, and guide slots 46, are only partially shown. Normally the conductors and guide slots would be continuous all the way around the track. The light transmitting sections shown at 41 could be spaced apart as shown to give the emitted light rays a pulsing action. The vehicle guide slot is shown at 47.

FIG. 5 shows the combination of a number of embodiments. Light sources 73 and 82 are shown angled into the track defined by the angle Ø. Angle Ø is the angle between the incident light rays and the operating surface. This angle Ø is important because it influences the viewing angle to the viewer. The angle shown is less than 90 degrees and preferably about 45 degrees. In FIG. 5 the light sources, shown at 73 and 82, are pointed toward each other. Light rays are thus projected both ahead and behind the vehicle. This gives a very large moving segment of light at the edges of the track centered on the vehicle when used with reflective features as shown in FIG. 1. If the light sources are perpendicular to the track as shown by light source, 74 then the light segment is smaller. Either configuration can be used, the choice dictated by the size of the emitted light desired. The energy source to power the light sources, 73 and 82 is shown at 75. This energy source, as previously discussed, can be a capacitor or a battery. Also shown in FIG. 5 are interconnective wires 81. The interconnective wires 81 are shown connected in series with energy storage device 75. Additionally, in the case of rechargeable capacitor or a rechargeable battery, it is desirable to have an accessible rechargeable electrical connection. This connection is shown at electrical contacts, 77. In FIG. 5 the track is shown generally at 79. Additionally shown in FIG. 5 are reflecting surfaces 87 and 88. Reflecting surfaces 87 and 88 can reflect and redirect light rays in line with the direction of the moving vehicle. As shown, light source 74 emits light rays 78, these light rays are reflected at surface 87, then projected through void 99 back behind the vehicle, again reflected at surface 88, and emitted at surface 89. End surfaces 97 of void 99 should be generally normal to transmitted light rays 98 so that unwanted reflection does not occur. This sequence would be repeated as the vehicle moves past additional reflective surfaces. As the vehicle encounters another pair of reflecting surfaces the light rays would then be emitted as a segment of light ahead of the vehicle, while the light ray segment behind the vehicle would be no longer visible. Also illustrated in FIG. 5 is support surface 90 and operating surface 91.

FIG. 6 illustrates in perspective view several different embodiments of reflective features in track 60.. The reflective surfaces shown in FIG. 6 are formed by slots in either the operating or the support surface of track shown generally at 66. Track 66 is of the configuration shown in end view in FIG. 1. Reflective surfaces 5 in FIG. 1 correspond to reflective features 5 in FIG. 6. Complimentary reflecting surfaces 68 and 69 are shown in the supporting surface 61. FIG. 6 shows in phantom reflecting surfaces 87 and 88 spaced a distance L apart. The distance L would be the distance slightly greater than the length of the vehicle so that when a light source such as, 74, shown in FIG. 5, projects light rays onto reflecting surface 87, they are reflected as shown, underneath and behind the vehicle. The spacing of reflecting surfaces 87 and 88 should be greater than the length of the vehicle so that the emitted light rays are not obscured by the vehicle itself. If the distance L is shorter than the length of the vehicle light rays are emitted into the vehicle. The effect can be utilized to light the vehicle itself from the underneath the vehicle. In FIG. 6, reflective surfaces 87 and 88 are seen to be transverse to the direction of the travel of the vehicle. This orientation would provide for emitted light rays in line with the direction of travel of the vehicle. When the vehicle speed is high the apparent pulsing of emitted light rays diminishes due to the human eye continuing to "see" the previous portion of emitted light rays despite the fact that they are no longer present. Because of this effect at high vehicle speeds the pulsing disappears and a continuous large segment of light appears in front of or behind the vehicle. Reflective surfaces 61 and 63, shown in phantom FIG. 6, on the other hand, have the reflecting surfaces in line with the direction of the vehicle and would reflect light perpendicular to the direction of the vehicle as shown in FIGS. 1, 2 and 3. Slots 61 are discontinuous in nature and thus would reflect light in a discontinuous manner. As the vehicle travels over the un-slotted sections 62, the light rays pass straight through the track and is not reflected. Slot 63 is shown to be continuous in nature and would give continuous output of light unless emitting surface 64 is painted with an opaque material shown at 65 thus preventing emission of the light. Additional reflective surfaces shown at 66 could also be utilized to block transmitted light. The direction of travel can be in two directions and is indicated with arrow 70.

When the light source 98 is located at the rear of the vehicle, as shown in FIG. 7, light rays 99 are aimed in to the operating surface 91, reflecting off first reflecting surface 85 and also reflecting off second reflecting surface 86. The operating surface of the track 91 also acts as a reflecting surface at 87 due to the incident angle of the reflected light. As can be appreciated, both support surface 90 and operating surface 91 can function as additional reflecting surfaces. This characteristic is very important if it is desired to emit light rays from more than one reflecting surface at a time. Using this multiple reflecting and emitting surface technique with a yellow LED or white incandescent lamp results in a very long yellow light being emitted behind the traveling vehicle. This emitted light has the appearance of flames being emitted from the back of the vehicle. As previously mentioned, internal reflection can be obtained by proper orientation of the reflective surfaces, thus allowing long projection of light rays within the track. The proper orientation can be determined by using the standard formulas for geometrical optics. By optimizing the angles of the reflecting surfaces, efficient reflection of light can be obtained without the use of supplemental reflective coatings. If desired or warranted however, a supplemental reflective coating can be incorporated to the reflective surface.

The path of a light ray when multiple reflecting segments are utilized simultaneously is illustrated in FIG. 7. The length of reflecting surface 85 and the speed of the vehicle traveling down the track determines the period of time the light ray originating from the vehicle is projected on to the reflecting surface 85. This period of time, defined as the light ray residence time, partially determines the intensity of the emitted light. In order to maximize this residence time and thus maximize the emitted light ray intensity, the size of the reflective surface should be as long as possible in the direction of vehicle travel. Unfortunately, if the length of reflecting surface 85 is increased, the distance between the support surface and the operating surface is also increased. Thus, increasing the length of reflective surface 85 has the undesirable effect of increasing the amount of material required to fabricate the track. By partitioning a large reflecting surface into several sections as shown in FIG. 7, effectively a large reflective surface can be obtained by utilizing several smaller reflecting surfaces to act as one. For light ray 99 shown, this large reflecting surface is composed of reflecting surfaces 85, 86, 87 and 83. By utilizing this technique a low profile track using a minimum of material can be obtained. As can be seen in FIG. 7, a single light ray can reflect off of more than one reflecting surface. The number of times a given light ray is reflected depends on the incident angle of the light ray and the angles of the reflecting surfaces. Utilizing this multiple reflection technique results in a very long emitted light despite a low profile track configuration. This technique is especially useful for flexible type track which must maintain a low profile in order to retain it's flexibility. Also shown in FIG. 7 is the distance between first reflecting surface 81 and second reflective surface 84 defined as length A. As can be seen in the figure this length A between two operative pairs of reflective surfaces such as 81 and 84 determines the distance from the incident light ray and the first emitted light ray. When designing the track's reflecting and emitting surfaces the refraction of the light rays should also be taken into account. When the light rays enter or exit from materials with differing indexes of refraction. The light rays emitted from light source 76 are shown generally at 97. As previously mentioned the design rules for reflection and refraction may be obtained using standard geometric optical formulas. An additional light source 76 can be used to reflect light off an portions of the track using reflective surfaces oriented such as 81, 85, 88 and 89.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather then the foregoing description, and all changes which come within the meaning and range of equivalents thereof are intended to be embraced therein.

What is claimed is:

1. A vehicle track lighting system comprising:
   a track having an operating surface and guide means mechanically contacting a vehicle to confine a vehicle thereon, said track having edges and including a reflecting surface non-parallel to said operating surface and below said operating surface to redirect light rays that may be directed into said operating surface substantially parallel to said operating surface, said track further including an emitting surface to allow redirected light rays out of said track remote from a vehicle that may be moving on said track; and
   a vehicle for said track, said vehicle having a light source to direct light rays into said operating surface of said track.

2. A track as in claim 1 wherein said track is made of a material capable of transmitting light rays within itself.

3. A track as in claim 2 further including a reflective coating on said reflective surface.

4. A track as in claim 2 wherein said track is made of a transparent material.

5. A track as in claim 2 wherein said track is made of a translucent material.

6. A track as in claim 5 wherein said emitting surface is associated with said edge to allow light rays out of said edge.

7. A track as in claim 5 wherein said emitting surface is remote from said edge to allow light rays out of said operating surface.

8. A track as in claim 5 wherein said emitting surface has a major axis which is generally parallel to the direction of travel.

9. A track as in claim 1 wherein the track includes an emitting surface beyond the edge of the track.

10. A track as in claim 9 including a connectable accessory wherein a portion of the emitting surface is through said connectable accessory.

11. A track as in claim 1 which further includes a back lighting feature.

12. A track as in claim 11 wherein the back lighting feature is luminous material in the track.

13. A track as in claim 11 wherein the back lighting feature is a fluorescing material in the track.

14. A track as in claim 11 wherein the back lighting feature is an electroluminescent light operatively connected to the track.

15. A track as in claim 11 wherein the back lighting feature is an incandescent light operatively connected to the track.

16. A track as in claim 11 wherein the back lighting feature is a light emitting diode operatively connected to the track.

17. A track as in claim 1 further including a support surface below said reflecting surface.

18. A track as in claim 17 wherein said operating surface has discontinuities, said discontinuities comprising said reflecting surface.

19. A track as in claim 17 wherein said support surface has discontinuities, said discontinuities comprising said reflecting surface.

20. A track as in claim 17 wherein said operating surface acts as an additional reflecting surface.

21. A track as in claim 17 wherein said support surface acts as an additional reflecting surface.

22. A vehicle as in claim 1 wherein a power source for said light source is internal to said vehicle.

23. A vehicle as in claim 1 wherein a power source for said light source is external to said vehicle.

24. A vehicle as in claim 1 wherein said light source is a light emitting diode.

25. A vehicle as in claim 1 wherein said light source is an incandescent light with a focusing element.

26. A vehicle as in claim 1 wherein said light source is a neon light.

27. A vehicle as in claim 1 wherein the light rays are directed normal to the operating surface.

28. A vehicle as in claim 1 wherein the light rays are directed at an angle to the normal of the operating surface.

29. A system as in claim 1 wherein said track includes electrical conductors in operating surface and said light source is operatively connected to said electrical conductors.

* * * * *